United States Patent [19]

Lang

[11] Patent Number: 5,209,609
[45] Date of Patent: May 11, 1993

[54] PNEUMATIC TUBE CONVEYOR STATION

[75] Inventor: Hartmut Lang, Plochingen, Fed. Rep. of Germany

[73] Assignee: Infotronic Vertriebsgesellschaft fuer Kommunikationssysteme mbH, Plochingen, Fed. Rep. of Germany

[21] Appl. No.: 744,334

[22] Filed: Aug. 13, 1991

[51] Int. Cl.$^5$ .................................................. B65G 51/26
[52] U.S. Cl. ........................................ 406/112; 406/76
[58] Field of Search .................. 406/112, 76, 148, 149, 406/180

[56] References Cited

U.S. PATENT DOCUMENTS

| 735,861 | 8/1903 | Davis | 406/112 X |
| 4,084,770 | 4/1978 | Warmann | 406/149 |
| 4,256,418 | 3/1981 | Stangl | 406/112 |
| 4,661,026 | 4/1987 | Carlier | 406/112 X |
| 4,820,086 | 4/1989 | Kieronski | 406/112 |
| 4,993,882 | 2/1991 | Nishizuka et al. | 406/76 X |

FOREIGN PATENT DOCUMENTS

| 3435500 | 4/1986 | Fed. Rep. of Germany. | |
| 601221 | 1/1960 | Italy | 406/76 |
| 40102 | 3/1980 | Japan | 406/112 |
| 201727 | 9/1987 | Japan | 406/112 |
| 162625 | 6/1989 | Japan | 406/76 |
| 1333596 | 10/1973 | United Kingdom | 406/112 |

Primary Examiner—Charles A. Marmor
Assistant Examiner—James M. Kannofsky
Attorney, Agent, or Firm—Porter, Wright, Morris & Arthur

[57] ABSTRACT

A pneumatic tube conveyor station comprises a housing connected to a pneumatic conveyor tube. A tube section is arranged displaceably within the housing. For dispatching or receiving conveying cases, the tube section can be brought into alignment with, and connected to, the conveyor tube in a pressure-tight relationship. For loading or unloading conveying cases, the tube section can be brought into a position axially spaced from the conveyor tube. The conveying cases can be displaced within the station between a receive/dispatch position where they are arranged coaxially with the conveyor tube, and a load/unload position where they are arranged parallel to the conveyor tube but distant therefrom. The tube section is displaced in an axial direction by a distance greater than the length (L) of one conveying case. An axial stop is provided for stopping arriving conveying cases in the receive/dispatch position.

12 Claims, 5 Drawing Sheets

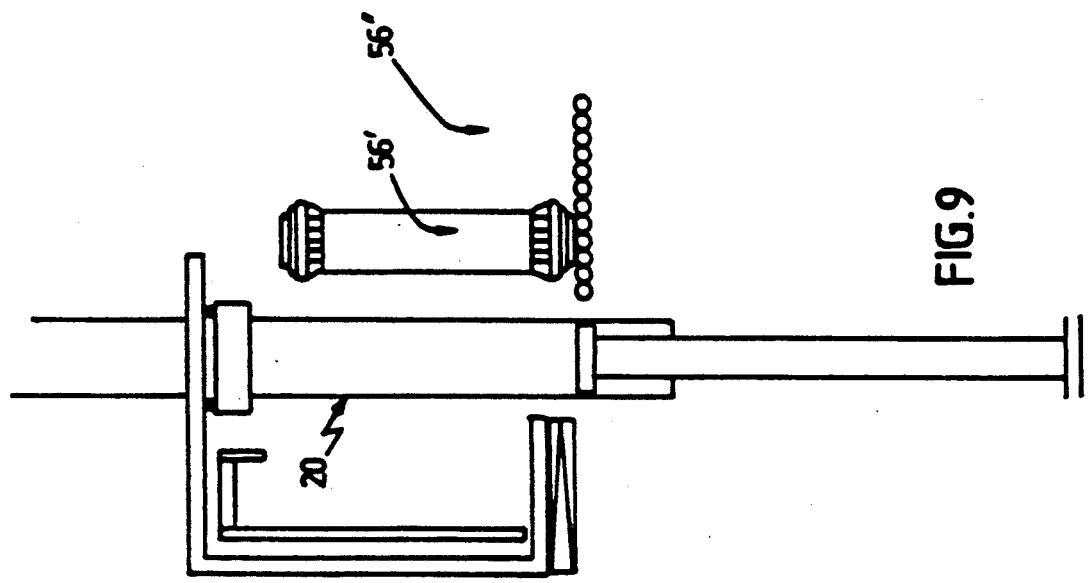
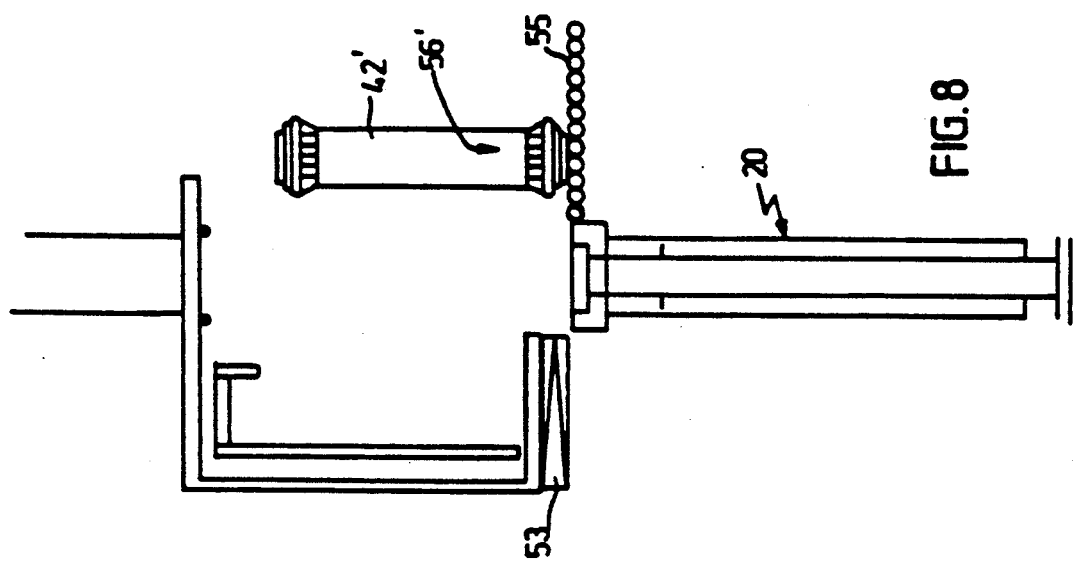

PNEUMATIC TUBE CONVEYOR STATION

The present invention relates to a pneumatic tube conveyor station comprising a connection for a forwarding tube and a tube section which can be moved inside the pneumatic tube conveyor station and which can be brought into alignment with, and connected to, the forwarding tube in a pressure-tight relationship for dispatching or receiving conveying cases, or can be brought into a position spaced from the forwarding tube for loading or removing conveying cases, the conveying case being displaced inside the pneumatic tube conveyor station between a loading and/or removing position and a dispatching and/or receiving position, in a direction perpendicular to the forwarding direction.

A pneumatic tube conveyor station of the type described above has been known from German Disclosure Document No. 34 35 500.

The known pneumatic tube conveyor station comprises a housing which has two tube sockets connected to its top side and one tube socket connected to its bottom, the socket connected to the bottom being aligned with one of the tube sockets connected to its top. The housing of the pneumatic tube conveyor station accommodates a slide which can be displaced in a horizontal direction and which comprises a full-length straight tube section and a curved tube section. By displacing the slide, it is possible on the one hand to connect the two aligned tube sections provided on the top and at the bottom of the station, respectively, via the straight full-length tube section. It is possible in this manner, for example, to establish a passage between two forwarding tubes. When one of the tube sockets is connected to a forwarding tube and the slide is transferred into a position in which one end of the curved tube section is in alignment with the forwarding tube and its other end is positioned above a baffle plate, then a conveying case can be received from the forwarding tube. If, on the other hand, the slide is set in such a way that the curved tube section is brought into alignment with a tube socket which serves for dispatching conveying cases, then, provided the dimensions are properly selected, the other end of the curved tube section can be connected directly with a forwarding tube, or may again end above a baffle plate so that a conveying case to be dispatched is initially stored temporarily above the baffle plate, for being then loaded into a forwarding tube by another displacement of the slide.

The known pneumatic tube conveyor station is suited for conventional pneumatic tube conveyors where lightweight objects, for example papers, bank notes, medicines, or the like, are to be transported pneumatically.

Recently, however, pneumatic conveying technology has found new applications in what is known as "heavy-duty pneumatic conveying". One understands by this term pneumatic conveying systems where heavy-weight objects, such as machine elements, assembly materials, tools, or the like, are transported in factory plants from a central store to different working or assembly positions. The weight of an individual conveying case handled by heavy-duty conveyor systems may be as high as 10 to 20 kg, or even more.

The known pneumatic tube conveyor station is not suited for such applications because when handling conveying cases of high weight, special precautions must be taken in order to prevent on the one hand any risk of injury for the user of the pneumatic tube conveyor system and, on the other hand, any risk of damage to the components of the pneumatic tube conveyor system. When loading or removing conveying cases of high weight, for example, it is important to provide reproducible conditions so as to avoid people from being injured and material from being damaged if such conveying cases should be handled without the necessary care.

Now, it is the object of the present invention to improve a pneumatic tube conveyor station of the type described above in such a way as to make it suited also for the requirements of heavy-duty pneumatic conveying.

The invention achieves this object by the fact that the tube section can be displaced in the forwarding direction by at least the length of one conveying case and that holding means acting in the forwarding direction are provided for the conveying case in the dispatching and/or receiving position.

This solves the object underlying the present invention fully and perfectly. For, if the movable tube section occupies its position spaced from the forwarding tube connection, then the conveying case can be moved between the loading position and the dispatching position in various reproducible ways during the loading and the subsequent dispatching process, as the conveying case does not have to be introduced into a tube section, but must be transferred only to a position on the holding means, in a direction perpendicular to the forwarding direction. The same applies by analogy to the transfer of an arriving conveying case to the unloading position because here again the moveable tube section occupies its retracted position so that the conveying case is free on all sides for being transferred to the unloading position by suitable means.

According to a preferred embodiment of the invention, the holding means takes the form of a column extending in the forwarding direction and terminating by a supporting disc in the dispatching and/or receiving position.

This feature provides the advantage that the load exerted on the holding means by an arriving conveying case can be absorbed particularly efficiently. This is true especially when the tube section can be moved toward the column and slides over the column because in this case the supporting disc, and the column connected therewith, may remain in position and need not be displaced themselves. It is then possible to anchor the column firmly so as to absorb the considerable kinetic energies developed by arriving conveying cases of the heavy type, and this in particular in the event the braking means, for example the pneumatic braking means for the conveying cases, should fail due to a defect in the system.

It is, therefore, particularly preferred if the arrangement is selected in such a way that the receiving position, i.e., the column in the before-mentioned embodiment, has that end, which faces away from the supporting disc, supported on a stationary base. It is thus possible to use as abutment the very building in which the pneumatic tube conveyor system is installed.

It is further preferred, in particular for these embodiments, if the receiving position comprises a shock absorber acting in the forwarding direction.

This feature provides the advantage to permit effective conversion of the energy, the kinetic energy of the heavy-duty conveying cases arriving at high speed being converted to thermal energy. This is true in particular when the shock absorber is of the oil-hydraulic type.

Other embodiments of the invention provide, as have been indicated before, that the tube section can be moved away from the connection in the forwarding direction.

This feature provides the advantage that the tube section may be of the same kind as the forwarding tube because no telescope-like arrangement is required in this case when the tube section is moved away from the connection in the forwarding direction, as would be the case if the tube section were to be moved in the direction toward the forwarding tube. The movement of the tube section in this direction further provides the before-mentioned advantage that when a column is used as abutment in the receiving station the tube section can slide over the column.

According to other embodiments of the invention, a conveying case that has to be dispatched can be fed from the loading position to the dispatching position by means of a first slide.

This feature provides the advantage that the transfer from the loading position to the dispatching position is effected in a reproducible way and, consequently, with forces and loads that can be calculated in advance. Overloading of components is, therefore, just as improbable as damage to the users of the pneumatic tube conveyor system, the latter being no longer required to intervene in any way during transfer of the case from the loading position to the dispatching position. Further, the slide provides the additional advantage that serial dispatching of a plurality of conveying cases loaded into the loading position and stored therein is rendered possible by causing the slide to transfer at any time from the loading position to the dispatching position for example the first case in the tube.

The same applies by analogy if, according to other embodiments of the invention, a conveying case received can be transferred from the receiving position to the unloading position by means of a second slide.

It goes without saying that the pneumatic tube conveyor station according to the invention may be designed either as mere dispatching or as mere receiving station, or else as combined dispatching and receiving station.

In the latter case, it is particularly preferred if the loading position and the first slide are arranged above the receiving position and preferably above the second slide.

This feature provides the advantage that the force of gravity can be utilized to aid the transfer between the loading position and the dispatching position.

In the case of the embodiment just described, if a first and a second slide are provided, it is preferred that these are arranged one below the other.

This feature offers the advantage that the mechanical elements driving the slide can be given a compact design. Another advantage of this arrangement lies in the fact that the transfer from the loading position to the dispatching position on the one hand, and the transfer from the receiving position to the unloading position, on the other hand, can be effected by pushing, i.e., in the same direction, when the loading position and the unloading position are disposed on opposite sides of the dispatching and the receiving position, respectively, an arrangement which generally should be advantageous for reasons of space.

Another preferred embodiment of the invention provides that the tube section can be displaced in such a way that its upper edge comes to lie at the level of the loading position, for transferring a conveying case to be dispatched from the loading position to the dispatching position.

It is the dual advantage of this feature that on the one hand use can be made of the force of gravity to aid the transfer of the conveying case from the loading position to the dispatching position, and that on the other hand the upper collar of the tube section, whose upper edge is arranged above the holding means of the dispatching position, serves additionally as a centering aid.

It is further preferred for these embodiments of the invention, which utilize the force of gravity if the first slide comprises a guide acting in the vertical axial direction.

This feature provides the advantage to prevent tilting of the conveying case as the latter passes the step between the loading position and the dispatching position, the case being held by the guide acting in the forwarding direction until it has come to rest safely in the dispatching position.

According to still another embodiment of the invention, the unloading position is arranged at the same level as the receiving position. This feature provides the advantage that the transfer from the receiving position to the unloading position can be effected by a simple lateral sliding movement.

Further, a particularly good effect is achieved according to the invention when the loading and/or unloading positions are designed as roller beds for buffering a plurality of conveying cases.

This feature offers the advantage to render possible fully-automatic operation of the pneumatic tube conveyor system, providing the possibility of having a plurality of conveying cases dispatched or received without any operator intervention.

Other advantages of the invention will appear from the specification and the attached drawing.

It is understood that the features that have been described before and will be explained hereafter may be used not only in the described combinations, but also in any other combination, or individually, without leaving the scope and intent of the present invention.

One embodiment of the invention will now be described in more detail with reference to the drawing in which:

FIGS. 5 to 9 are representations similar to those of FIGS. 2 to 4, but illustrating a receiving process.

Figure 1:
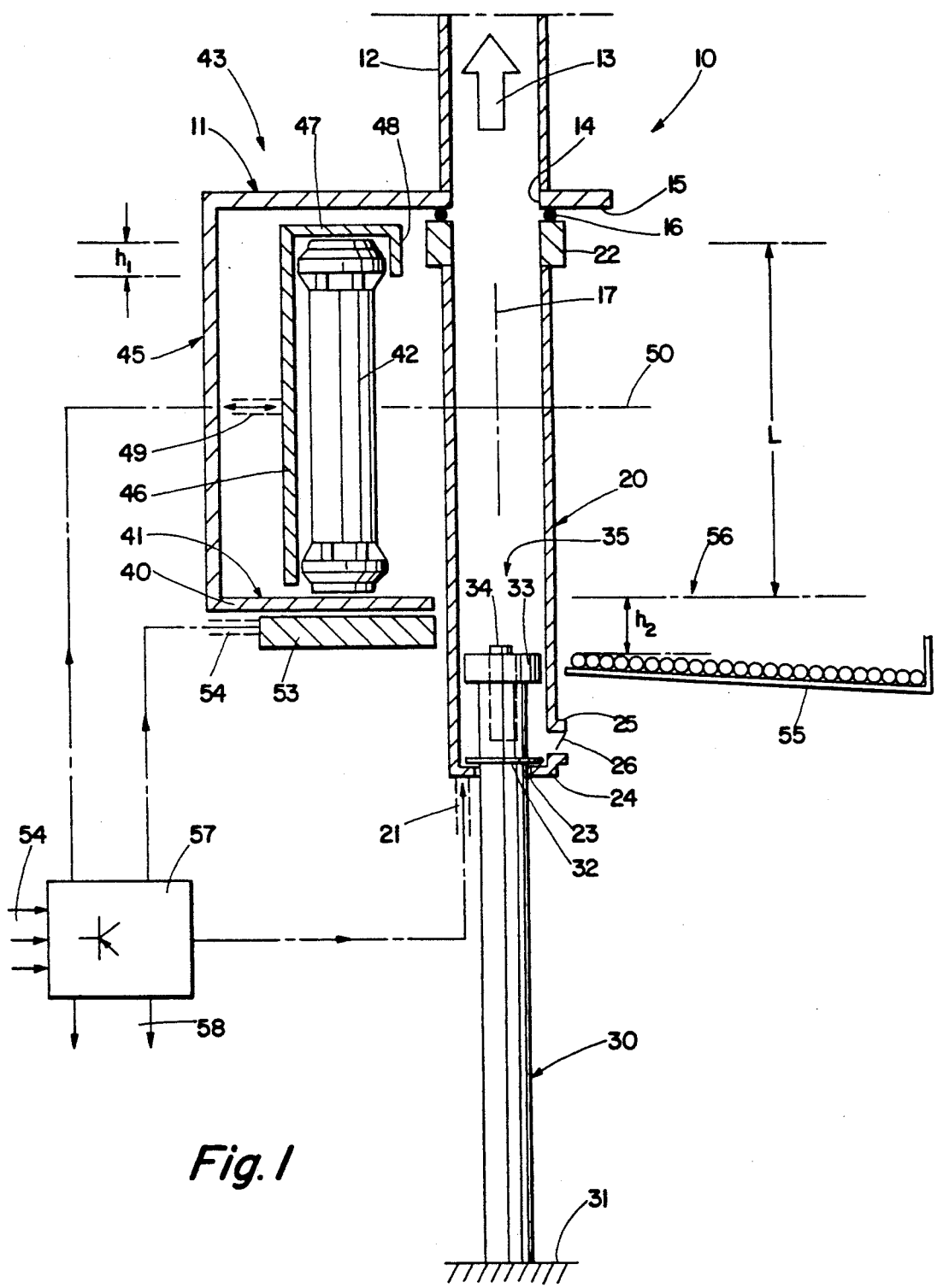
FIG. 1 shows a side view, cut away in part, of one embodiment of a pneumatic tube conveyor station according to the invention.

In FIG. 1, one embodiment of a pneumatic tube conveyor station according to the invention is indicated generally by reference numeral 10. The pneumatic tube conveyor station 10 comprises a housing 11 with a forwarding tube 12 connected to its top, preferably in pressure-tight relationship. Inside the forwarding tube 12, an overpressure or low-pressure condition can be produced by blowers, in the manner known as such. The illustrated embodiment, for example, makes use of the low-pressure approach, as indicated by arrow 13 in FIG. 1, although it should be noted that this, just as the kind and direction of the connection of the forwarding tube 12, are to be understood as examples only.

The forwarding tube 12 opens into a connection opening 14 of the housing 11. The bottom face 15 of the tap wall (47) of the housing 11 carries a seal 16, for example an "0" ring, in stationary arrangement.

The forwarding tube 12 and the surface normal of the connection opening 14 define a first axis 17 or the forwarding direction of incoming or outgoing conveying cases.

A tube section 20 can be displaced in the direction of this first axis 17 by means of a first displacing device 21 which is indicated in the drawing very diagrammatically. The tube section 20 carries on its upper end an annular flange 22 of increased cross-section, which in the position illustrated in FIG. 1 rests against the bottom face of the connection opening 14 in a pressure-tight relationship, sealed by the seal 16.

At the opposite end of the tube section 20, a passage bore 23 is provided in the bottom 24 of the tube section 20. A short way above the bottom 24, a tube socket 25, which is equipped with a flap valve 26, protrudes laterally from the tube section 20. In the case of the embodiment illustrated in FIG. 1, where the pneumatic tube conveyor station 10 operates at low pressure (arrow 13), the flap valve 26 is designed in such a way that it assumes its open position when low-pressure conditions exist in the tube section 20, and assumes its closed position when overpressure prevails.

A column 30, which extends in the direction of the first axis 17, has its lower end supported on a base 31, e.g., the building in which the pneumatic tube conveyor system is installed.

A sealing flange 32 arranged a short way below the upper end of the column 30, which in the position illustrated in FIG. 1 serves to seal the passage bore 23 by applying itself against the bottom 24. This is achieved in practice by further seals provided between the sealing flange 32 and the bottom 24 which are, however, not shown in FIG. 1 for the sake of clarity.

The upper end of the column 30 terminates by a supporting disc 33 having a cross-section clearly smaller than the interior cross-section of the tube section 20, so that air is permitted to flow laterally past the supporting disc 33 in the direction of the first axis 17.

Recessed into the supporting disc 33 is a shock absorber 34, preferably an oil-hydraulic shock absorber acting in the direction of the first axis 17. In the unloaded condition, the shock absorber 34 projects a little beyond the surface of the supporting disc 33, while in loaded condition, i.e., in the condition of maximum compression, it may be compressed down to the surface of the supporting disc 33.

The position above the supporting disc 33 will be described hereafter as dispatching or receiving position 35, depending on whether the pneumatic tube conveyor station 10 is used for dispatching or for receiving conveying cases.

The left side of the housing 11, as viewed in FIG. 1, is provided with a bottom 40 which simultaneously serves as support 41 for the conveying cases 42 to be dispatched. The position in which the conveying case 42 finds itself in FIG. 1 will be described hereafter as loading position 43. It is, however, understood, that additional conveying cases 42 can be buffered in a direction perpendicular to the drawing plane of FIG. 1 for being fed to the loading position 43 one by one.

Inside the housing 11, one can see a first slide 45 located in the area of the loading position 43. The first slide 45 comprises a vertical side wall 46, a horizontal top wall 47 and a wall section 48 protruding downwardly from the top wall 47. Consequently, the structure of the first slide 45 resembles essentially the shape of a "U" opening to the bottom, the right leg as viewed in FIG. 1, i.e. the wall section 48, being reduced in length.

The dimensions of this arrangement are selected in such a way that the vertical distance $h_1$ between the upper face of the conveying case 42 and the lower end of the wall section 48 is smaller than the vertical distance $h_2$ between the support 41 and the surface of the supporting disc 33 and the shock absorber 34, respectively. The purpose and effect of this arrangement will be described in more detail further below, by reference to FIG. 2.

The first slide 45 can be displaced along a second axis 50 standing substantially perpendicular to the first axis 17, by a second displacing device 49 which is likewise indicated only very diagrammatically. If the first axis 17 extends vertically, then the second axis 50 will of course extend horizontally.

The contour presented by the first slide 45 being substantially adapted to the outer contour of a conveying case 42, the second displacing device 49 is capable of displacing an outgoing conveying case 42 in the direction of the second axis 50 by form-locking engagement.

The side wall 46 may extend a certain distance to the front, in a direction perpendicular to the drawing plane of FIG. 1, and may then be bent off to the left so as to close off the access to the loading position 43 when the first slide 45 is displaced to the right.

Below the bottom 40, one can see a second slide 53, which can also be displaced in the direction of the second axis 50, by means of a third displacing device 54.

On the opposite side, a roller bed 55 is indicated which serves for receiving incoming conveyor cases. Reference numeral 56 as used hereafter therefore describes an unloading position where incoming conveying cases can be gripped on the roller bed 55 for being removed from the pneumatic tube conveyor station 10.

An electric control device 57 serves for controlling the displacing devices 21, 49 and 54. Further, there are provided control outputs 58 which may serve, for example, for controlling blowers, or the like. Control inputs 59 are supplied with control signals from a control computer, proximity switches or the like, in the manner known as such.

The operation of the pneumatic tube conveyor station 10 will now be described by reference to FIGS. 2 to 4 for a dispatching process, and by reference to FIGS. 5 to 9 for a receiving process.

For this purpose, reference is made once more to FIG. 1 where a conveying case 42 has been transferred to the loading position 43, in a direction perpendicular to the drawing plane of FIG. 1.

By actuating the first displacing device 21, the tube section 20 is now transferred from its upper end position illustrated in FIG. 1 to a lower position in which the upper edge of the annular flange 22 is in alignment with the support 41. This latter level is indicated by $y_1$ in FIG. 2, while the upper end position of the tube section 20 is indicated by $y_2$ and the level of the supporting disc 33 is indicated by $y_3$.

Now, the first slide 45 is displaced to the right, by actuating the second displacing unit 49. The first slide 45 entrains the conveying case 42 by form-locking engagement, until the conveying case 42 comes to slip down over the right edge of the support 41 and its lower end comes to rest on the supporting disc 33, under the action of the force of gravity. During this process, the annular flange 22 performs the function of a centering aid, because conveying cases are known to have thicker portions at their upper and lower ends, which perform the function of centering inside the forwarding tube. Given the fact, however, that the width of the sealing flange 32 is equal to the interior width of the forwarding tube 12, the lower end of the conveying case 42, i.e., the thicker portion of its lower end, will slide into the dispatching position 35 in form-locking engagement and, thus, in a well-centered condition.

Figure 2:
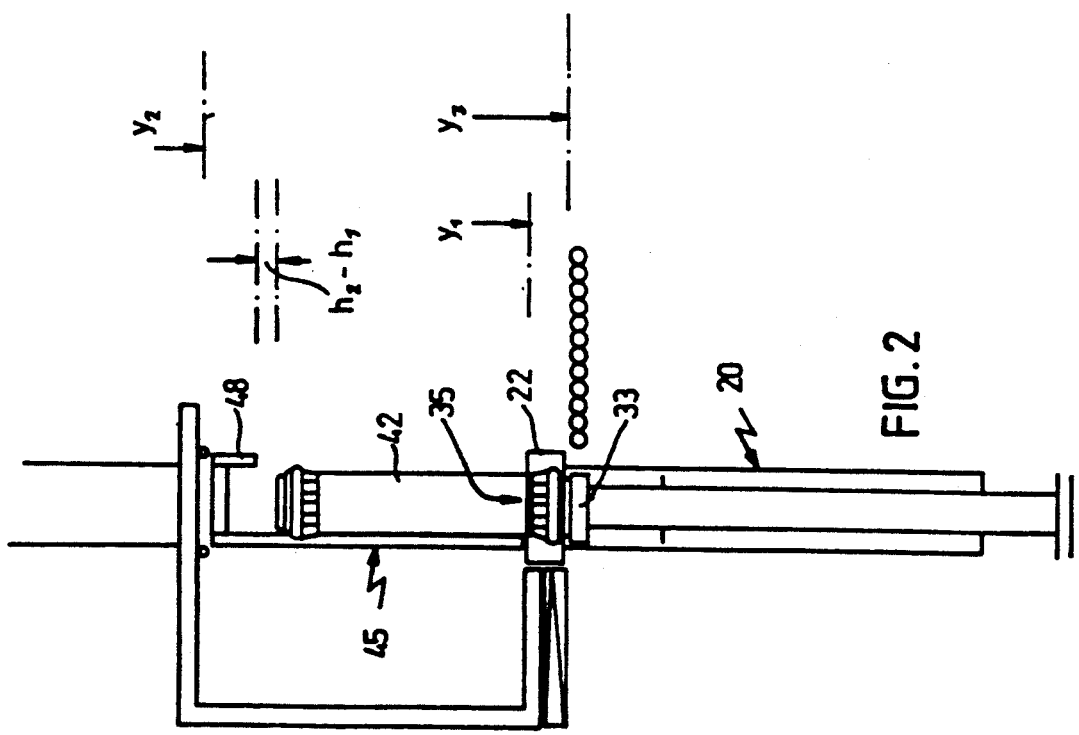

In order to prevent the upper end of the conveying case 42 from tilting to the right, as viewed in FIG. 2, during its downward movement from the support 41 into the annular flange 22, there is provided guide means designed as wall section 48 which acts as a guide in a vertical axial direction. The wall section 48 prevents the upper end of the conveying case 42 from tilting to the right and ensures in this manner that the conveying case 42 will slide down properly into the annular flange 22.

As has been mentioned before, the vertical length of the wall section 48 is selected in such a way that in the position illustrated in FIG. 2, where the conveying case 42 rests on the dispatching position 35, i.e., on the supporting disc 33, the upper end of the conveying case 42 has a vertical distance from the lower end of the wall section 48 equal to $h_2-h_1$.

Figure 3:
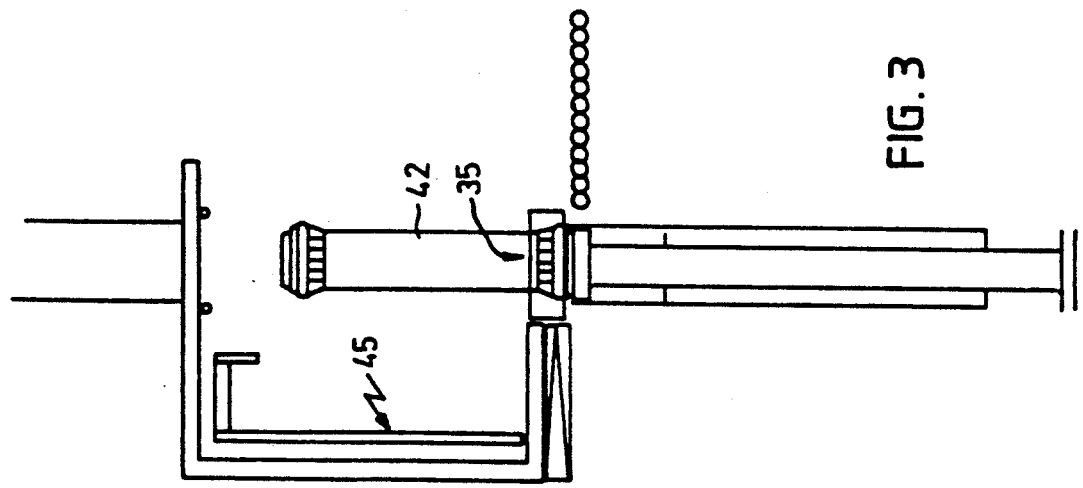
FIGS. 2 to 4 illustrate a dispatching process, in reduced scale and by way of diagrammatic representations similar to that of FIG. 1.

Consequently, the first slide 45 can now be moved back to the left, as illustrated in FIG. 3, by actuating the second displacing unit 49 so as to clear the space above the conveying case 42 in the dispatching position 35.

Figure 4:
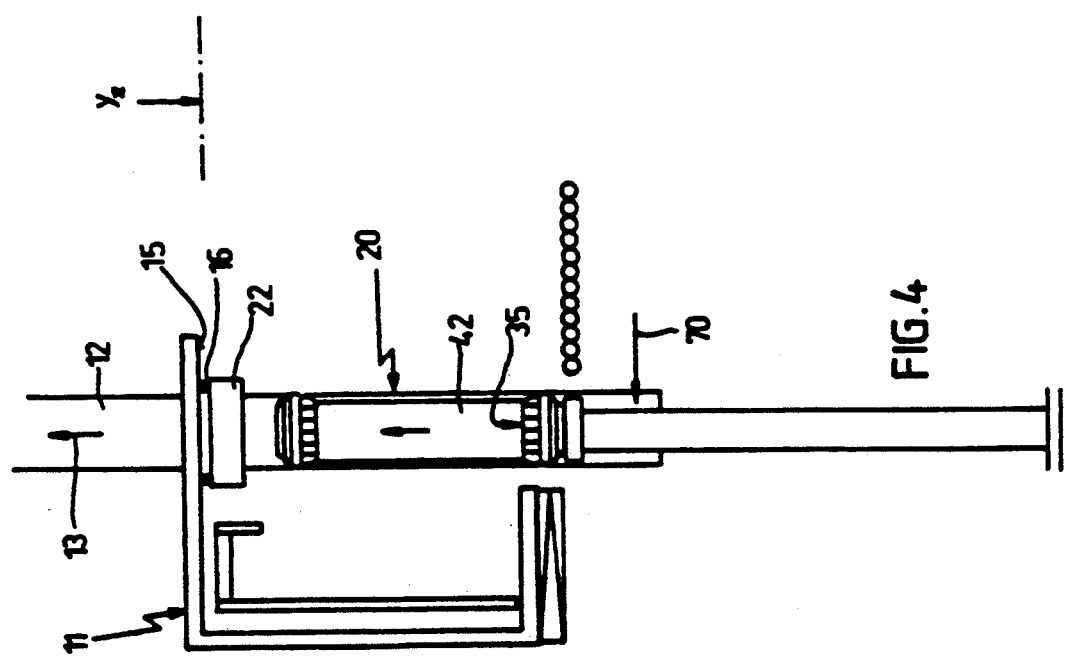

FIG. 4 now shows that the tube section 20 is lifted again, by actuation of the first displacing unit 21, until the upper edge of the annular flange 22 reaches the upper end position $y_2$ in which the annular flange 22 rests against the bottom face 15 of the housing 11 in tight relationship, due to the seal 16.

Now, when a low-pressure condition (arrow 13) is produced at this position in the forwarding tube 12, via the electronic control device 57, the conveying case 42 is drawn off into the system. Arrow 70 in FIG. 4 indicates that in this case air is permitted to enter the tube section 20 via the flap valve 26 and the tube socket 25, in order to permit the conveying case 42 to take off.

The process described before can be carried out several times in succession if a plurality of conveying cases 42 have to be loading from the dispatching position 43 one by one.

Figure 5:
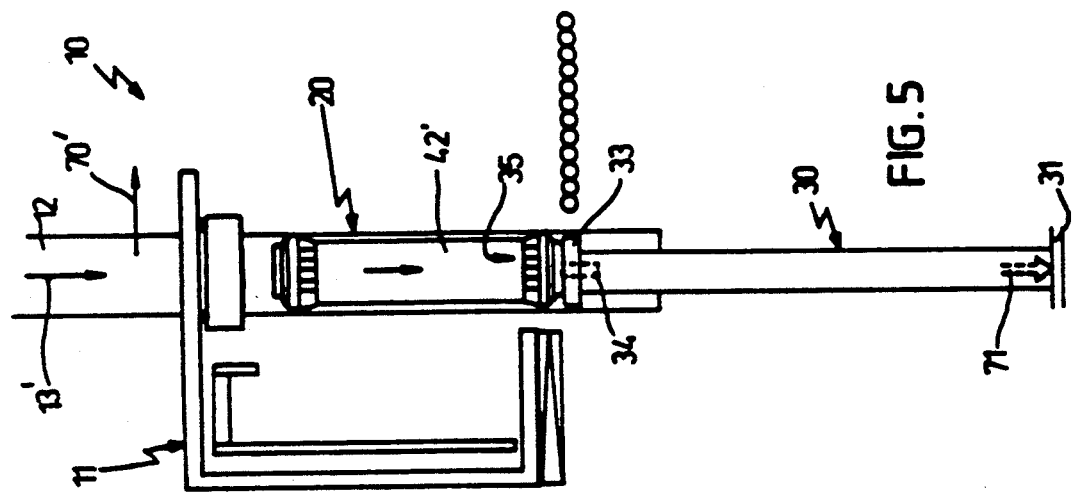

In contrast, FIG. 5 shows the initial position for the receipt of a conveying case 42'.

In this initial position, the tube section 20 occupies its upper end position. The incoming conveying case 42' arrives through the forwarding tube 12, as indicated by arrow 13'. This is achieved by producing an overpressure in the forwarding tube 12. The air pushed along the tube in front of the conveying case 42' is permitted to flow off through a valve, not shown in detail in FIG. 5, located a short way above the housing 11, as indicated by arrow 70'. Once the incoming conveying case 42' has passed this valve, it is braked by the air cushion now building up in front of it because the flap valve 26 at the tube socket 25 has assumed its closed position under the action of the overpressure prevailing in the forwarding tube 12 and the tube section 20, as described before.

The incoming conveying case 42' now lands on the receiving position 35, coming first into contact with the shock absorber 34 which is compressed by the residual kinetic energy of the conveying case 42'. Only after all or at least the largest part of the kinetic energy has been converted to thermal energy in the shock absorber 34 will the conveying case 42' come to settle on the supporting disc 33.

However, if the conveying case 42' should arrive at excessive speed, for example because no braking air cushion could built up in front of the conveying case 42' due to a defect of the flap valve 26, then the conveying case 42' will hit against the supporting disc 33 at high kinetic energy, the shock absorber 34 being sized only for absorbing the kinetic energy usually encountered in normal operation.

In the case of such a defect, a considerable load is absorbed by the column 30 and is transmitted by it to the base 31, as illustrated by arrow 71 in FIG. 5. However, as the arrangement of the column 30 is designed for such high loads, no damage will be caused to the pneumatic tube conveyor station 10, even if such a malfunction should occur.

Returning now to a regular receiving process, the incoming conveying case 42' has settled on the supporting disc 33, as has just been described.

Figure 6:
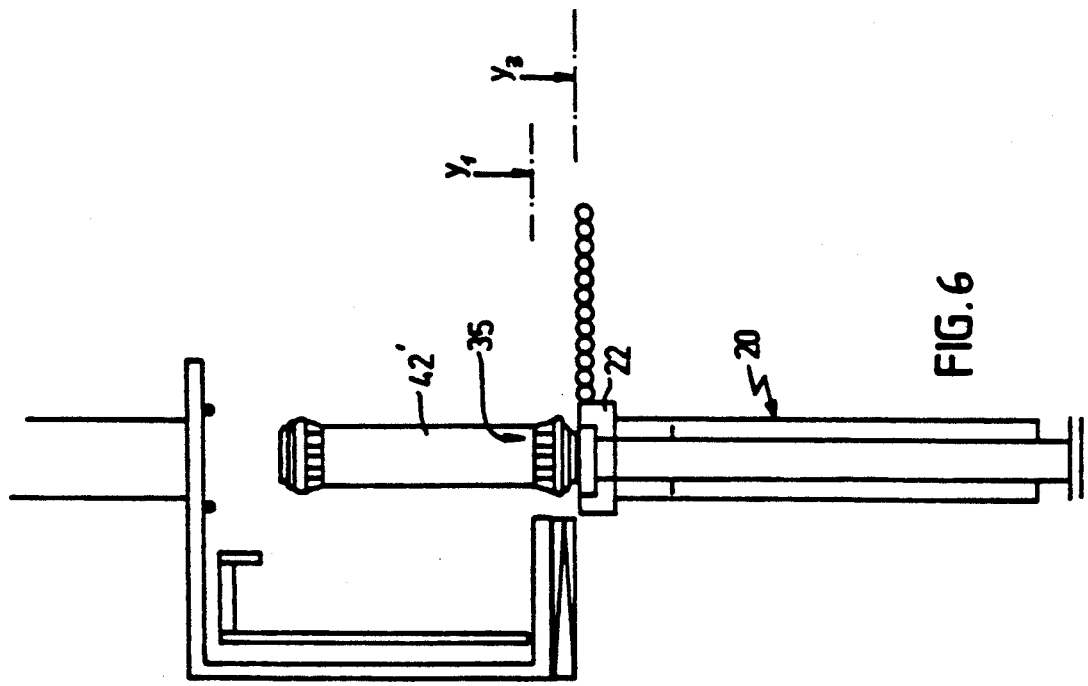

FIG. 6 now shows that as a next step the tube section 20 is displaced in a downward direction until the upper edge of the annular flange 22 finds itself at the level of the receiving position 35, i.e., the level $y_3$. This means that the tube section 20 now occupies a lower position than in the phase illustrated in FIG. 3 ($y_1$) so that the lower end of the conveying case 42' is not embraced by the annular flange 22.

Figure 7:
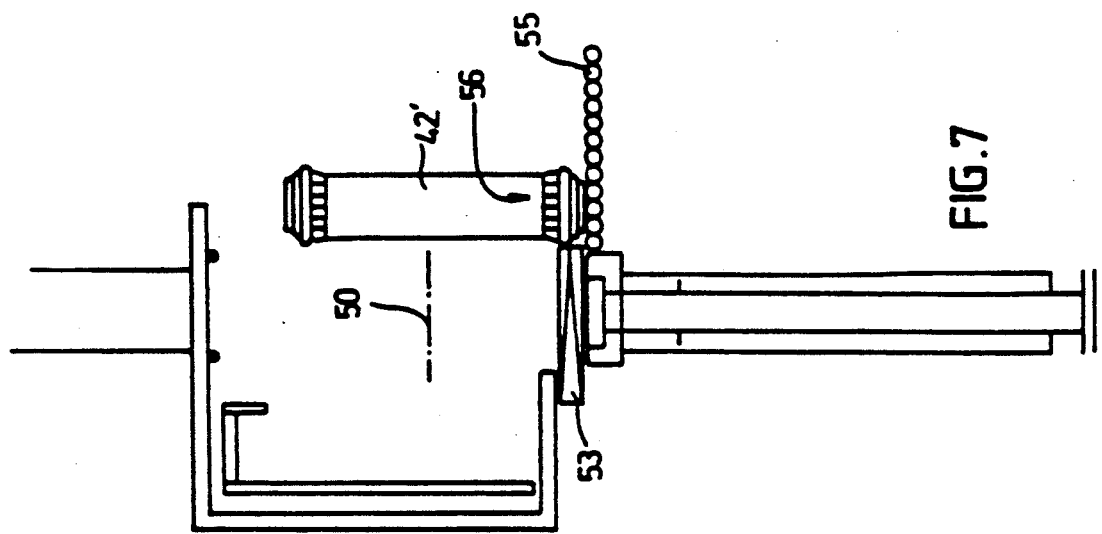

FIG. 7 shows the next phase where the second slide 53 is displaced to the right, in the direction of the second axis 50. During this movement, the second slide 53 grips the lower end of the conveying case 42', pushing it to the right into the unloading position 56 on the roller bed 55.

FIG. 8 shows that thereafter the second slide 53 has been returned to its initial position in order to clear the way for the tube section 20. The conveying case 42' may now have rolled down, under the action of the force of gravity, along the slightly inclined roller bed 55, for example into a position 56' and then into a second unloading position 56" as shown in FIG. 9 in order to make room for the next conveying case to be unloaded.

FIG. 9 finally shows that the tube section 20 is then returned to its upper end position, which is at the same time the rest position of the pneumatic tube conveyor station 10. The purpose of this is to avoid that a misdirected conveying case may erroneously arrive in the pneumatic tube conveyor station 10 and encounter a situation where the tube section 20 occupies a lower position, for example the end position illustrated in FIG. 8. If such a condition were to happen, the misdirected conveying case would emerge on the top of the forwarding tube 12 and fall down unbraked and unguided, and would finally hit the supporting disk 33, or maybe a place beside the latter, where serious damage could be caused. If, in contrast, the pneumatic tube conveyor station 10 is always maintained in the rest position illustrated in FIG. 9 when out of operation, this cannot happen because in this case even a misdirected conveying case arriving in the station would be braked in the described way and would settle smoothly on the supporting disc 33.

It is understood that numerous variants are imaginable within the scope of the present invention, without leaving the limits of the invention. In particular, there is of course the possibility, in addition to the mechanism of the pneumatic tube conveyor station 10 using the tube section 20 travelling in the forwarding direction 17, to make use also of the other described elements, either individually or in any other combination, without thereby exceeding the limits of the present invention. This applies in particular to the measure of having the receiving position 35 supported by the foundation 31 of the building, and further to the measure of providing a shock absorber 34 in the receiving position 35, and finally also to the measure of using roller beds 55, or the like, for buffering conveying cases 42 or 42' at the loading position 43 and/or the unloading position 56, as indicated clearly at 56' and 56" in FIG. 9.

I claim:

1. A pneumatic tube conveyor station for dispatching or receiving a conveying case of a predetermined length (L), comprising:
   a housing comprising an upper horizontal member having a first opening therein, a lower horizontal support member, and a vertical member having a second opening therein slightly larger than said predetermined length (L), said second opening defining an axis;
   a pneumatic conveyor tube connected to the upper surface of said upper horizontal member in alignment with said first opening;
   sealing means arranged around said first opening on the lower surface of said upper horizontal member;
   a displaceable tube section arranged adjacent said second opening and aligned underneath said first opening, said tube section comprising an upper end adapted for mating said sealing means;
   first displacing means for displacing said tube section along said axis, said tube section abutting said first opening and said upper end of said tube section mating with said sealing means when in a first operational position and said tube section being separated from said first opening by a distance greater than said predetermined length (L) when in second and third operational positions;
   axial stop means arranged coaxially with said axis for stopping an arriving conveying case in an axial position;
   second displacing means for displacing a conveying case in a direction perpendicular to said axis between a load position wherein said conveying case is located parallel to said axis and at a distance therefrom and a dispatch position wherein said conveying case is located coaxially to said axis, and between a receive position wherein said conveying case is located coaxially to said axis and an unload position wherein said conveying case is located parallel to said axis and at a distance therefrom.

2. The station of claim 1 wherein said axial stop means comprises a column extending along said axis, said column comprising a supporting disc, said supporting disc being located a distance greater than said predetermined length (L) from said first opening.

3. The station of claim 1, wherein said axial stop means is supported on a stationary base of a building.

4. The station of claim 1 wherein said axial stop means comprises a shock absorber acting in an axial direction.

5. The station of claim 4 wherein said shock absorber is an oil-hydraulic shock absorber.

6. The station of claim 1 wherein said second displacing means comprises pusher means for displacing said conveying case from said load position to said dispatch position.

7. The station of claim 1 wherein said second displacing means comprises pusher means for displacing said conveying case from said receive position to said unload position.

8. The station of claim 1 wherein said second displacing means comprises first pusher means for displacing said conveying case from said load position to said dispatch position and second pusher means for displacing said conveying case from said receive position to said unload position, said first pusher means being arranged vertically above said second pusher means and said load and said dispatch positions being arranged vertically above said receive and said unload positions.

9. The station of claim 8, wherein said upper end of said tube section is located at a vertical axial position corresponding to said dispatch position when said tube section is in said second operational position and said upper end of said tube section is located at a vertical axial position corresponding to said receive and said unload positions when said tube section in said third operational position.

10. The station of claim 1 wherein said second displacing means comprises first pusher means for displacing said conveying case from said load position to said dispatch position, said first pusher means comprising guide means for guiding said conveying case in a vertical axial direction.

11. The station of claim 1 wherein said axial stop means is arranged at the same vertical position as said receive and said unload positions.

12. The station of claim 1 wherein said unload position comprises a roller bed for buffering a plurality of conveying cases.

* * * * *